US006902220B2

(12) United States Patent
Moskos et al.

(10) Patent No.: US 6,902,220 B2
(45) Date of Patent: Jun. 7, 2005

(54) GOLF CART ENCLOSURE

(76) Inventors: Jack P Moskos, 5345 Pinebark La., Wesley Chapel, FL (US) 33543; Peter Trower, Greenmount, Lehigh Hill Road, Cobham, Surrey, KT11 2HS (GB)

( * ) Notice: Subject to any disclaimer, the term of this patent is extended or adjusted under 35 U.S.C. 154(b) by 0 days.

(21) Appl. No.: 10/695,860

(22) Filed: Oct. 30, 2003

(65) Prior Publication Data

US 2005/0093331 A1 May 5, 2005

(51) Int. Cl.[7] .............................................. B62D 25/00
(52) U.S. Cl. ..................... 296/79; 296/83; 296/96.21; 296/102; 296/155
(58) Field of Search .......................... 296/77.1, 79, 80, 296/82–83, 96.21, 102–103, 193.05, 155

(56) References Cited

U.S. PATENT DOCUMENTS

| | | | |
|---|---|---|---|
| 3,306,625 A * | 2/1967 | Ottosson ..................... | 280/748 |
| 4,461,609 A | 7/1984 | Zinno | |
| 4,544,198 A * | 10/1985 | Ochiai et al. ............... | 296/155 |
| 4,773,694 A | 9/1988 | Gerber | |
| 4,773,695 A * | 9/1988 | Jones et al. ................. | 296/77.1 |
| 4,792,175 A * | 12/1988 | Gerber ......................... | 296/79 |
| 4,932,714 A | 6/1990 | Chance | |
| 5,190,340 A | 3/1993 | Nuscher | |
| 5,217,275 A | 6/1993 | Ridge | |
| 5,310,235 A | 5/1994 | Seymour et al. | |
| 5,393,118 A | 2/1995 | Welborn | |
| 5,454,615 A * | 10/1995 | Schnepf ...................... | 296/95.1 |
| 5,468,183 A | 11/1995 | Hahn | |
| 5,688,018 A * | 11/1997 | Simpson ..................... | 296/138 |
| 5,788,317 A | 8/1998 | Nation | |
| 5,975,615 A | 11/1999 | Showalter | |
| 6,007,134 A | 12/1999 | Weston | |
| 6,206,447 B1 | 3/2001 | Nation | |
| 6,276,745 B1 * | 8/2001 | Wilson ....................... | 296/155 |
| 6,460,916 B2 | 10/2002 | Mizuta | |
| 6,547,304 B1 | 4/2003 | Conner et al. | |

FOREIGN PATENT DOCUMENTS

| EP | 0 237 494 | 9/1987 |
|---|---|---|
| GB | 2 129 745 | 5/1984 |

* cited by examiner

Primary Examiner—Dennis H. Pedder
(74) Attorney, Agent, or Firm—Richard C. Litman

(57) ABSTRACT

The golf cart enclosure is a complete structural enclosure that is mounted onto the chassis of a golf cart. The enclosure provides a support frame, a roof, front and rear windshields, sliding side doors and front and rear bibs. The side doors are slidably supported on roller tracks that allow the doors to be easily moved from an open to a closed position on either side of the golf cart. The front and rear windshields may be adjusted to allow a draft of air to enter into the enclosure. The enclosure is made from a lightweight material that protects the interior of the enclosure from undesirable weather conditions. The support frame provides front and rear cross bars that support the roof of the enclosure and improve the stability of the enclosure.

17 Claims, 11 Drawing Sheets

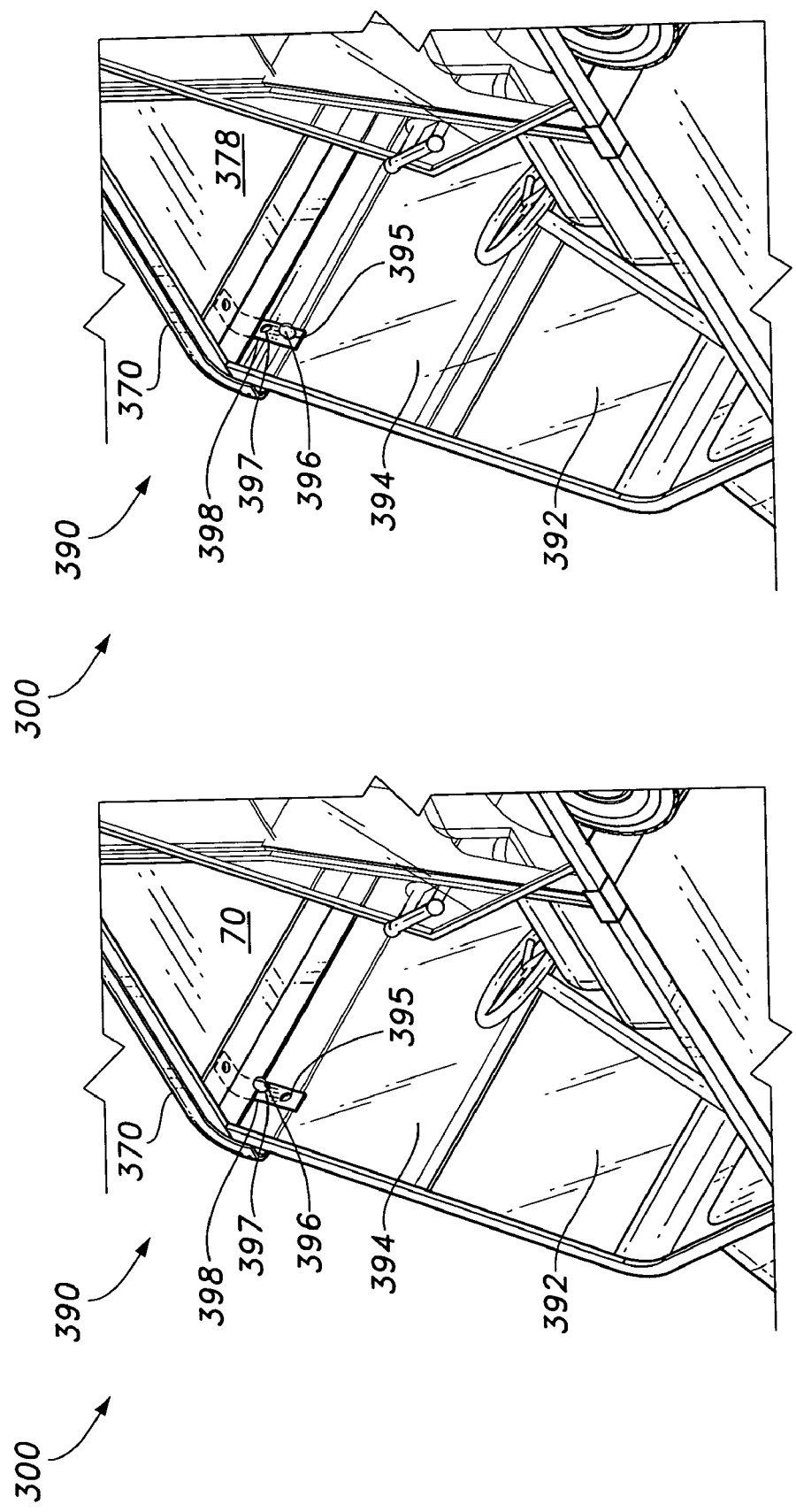

GOLF CART ENCLOSURE

BACKGROUND OF THE INVENTION

1. Field of the Invention

The present invention relates to golf cart enclosures and more particularly to a weatherproof golf cart enclosure assembly that is secured to the chassis of an existing golf cart, where the assembly provides a complete enclosure around the golf cart passengers.

2. Description of the Related Art

Golf carts are often used to transport golfers and their clubs around a golf course. Golf carts may also be used for other functions, but are generally used for transporting passengers and some form of baggage. Typically, a golf cart includes a cabin, having a seating area, which houses the controls of the golf cart. The golf cart usually also provides a roof secured to a frame structure above the passengers. The common golf cart usually has open sides allowing the passengers to easily step in and out of the golf cart. These common golf carts do not provide any protection from weather conditions such as rain, wind and excessive exposure to the sun. Many golf covers exist that may be secured to an existing golf cart frame to protect the passenger cabin of the golf cart. The following patent documents disclose existing golf cart covers as well as vehicle cabin enclosures.

U.S. Pat. No. 4,461,609 issued on Jul. 24, 1984 to Zinno, C. H. discloses a self-propelled wheelchair vehicle. The wheelchair vehicle includes a frame superstructure that is welded onto the chassis of the vehicle.

U.S. Pat. No. 4,773,694 issued on Sep. 27, 1988 to Gerber, C. E. discloses a golf cart enclosure that may be secured to an existing golf cart. The enclosure includes a roof panel having a configuration corresponding to the configuration of the roof structure of the golf cart, and a plurality of front, rear and side panels suspended from the roof panel. The roof panel provides a peripheral hem that allows each suspended panel to be folded and rolled upwardly and tucked under the roof panel.

U.S. Pat. No. 4,932,714 issued on Jun. 12, 1990 to Chance, H. discloses a demountable door for a golf cart. The demountable door provides a slidable clear plastic door that is mounted to either side of a golf cart.

U.S. Pat. No. 5,190,340 issued on Mar. 2, 1993 to Nuscher, E. H. discloses a golf cart rear roof unit. The roof unit is a canopy assembly that extends rearwardly from the roof of a golf cart to protect the rear baggage area of the golf cart.

U.S. Pat. No. 5,217,275 issued on Jun. 8, 1993 to Ridge, W. discloses a golf cart cover. The cover provides a flexible enclosure that covers an entire golf cart. The enclosure includes a plurality of panels that are secured to one another by zippers. Individual panels may be rolled up to open certain portions of the panels.

U.S. Pat. No. 5,310,235 issued on May 10, 1994 to Seymour et al. discloses a golf cart weather shield. The weather shield comprises a waterproof, flexible enclosure that completely surrounds the roof and sides of a golf cart. The enclosure includes a plurality of panels that are sewn together and cover the entire golf cart.

U.S. Pat. No. 5,393,118 issued on Feb. 28, 1995 to Welborn, R. B. discloses an aluminum framed vinyl enclosure for golf carts. The enclosure provides vinyl swinging doors having aluminum frames that are secured to the existing frame of a golf cart.

U.S. Pat. No. 5,468,183 issued on Nov. 21, 1995 to Hahn, K. S. discloses a clean air operator enclosure for a commercial sprayer. The operator enclosure includes a frame having four vertical uprights that are secured at their bottom ends to a vehicle chassis. A horizontal cover assembly is secured to the top ends of the vertical uprights. A plurality of glass panels is disposed in the upper portion of the frame, leaving an opening along the lower portion of the frame for improved ventilation.

U.S. Pat. No. 5,688,018 issued on Nov. 18, 1997 to Simpson, J. A. discloses a protective cover for golf bags on a golf cart. The cover comprises a clear vinyl sheet that is secured to the roof of a golf cart by metal snaps. The cover provides a hook at is bottom end for securing the bottom portion of the cover to the rear of the golf cart to cover the baggage area of the golf cart.

U.S. Pat. No. 5,788,317 issued on Aug. 4, 1998 to Nation, R. discloses a dual paneled golf cart enclosure. The enclosure comprises a plurality of panels. The panels comprise a combination of vinyl or plastic panels and mesh panels. The panels are secured to an enclosure top panel that is mounted over the existing roof of a golf cart. The panels are suspended from the top panel and cover the front, rear and sides of the golf cart. Depending on the weather conditions some or all of the front, rear and side panels may be rolled up to open the enclosure. The mesh panels allow air to enter into the enclosure while preventing insects from entering the enclosure.

U.S. Pat. No. 5,975,615 issued on Nov. 2, 1999 to Showalter, J. M. discloses a golf cart enclosure and windshield bracket. The device comprises a bracket that is secured to the windshield frame of a golf cart. The bracket has a rail member for receiving a golf cart enclosure panel and a golf cart windshield. The bracket retains the panel and the windshield adjacent to the golf cart windshield frame.

U.S. Pat. No. 6,007,134 issued on Dec. 28, 1999 to Weston, A. G. discloses a portable golf cart weather shield system. The system includes a front windshield portion, a rear windshield portion and a golf club compartment cover. The weather shield system is made from a flexible, transparent, waterproof material that may be rolled up for storage. The system is secured to an existing golf cart roof to protect the driver of the cart and the golf clubs in the back of the cart.

U.S. Pat. No. 6,206,447 issued on Mar. 27, 2001 to Nation, R. F. discloses a golf cart frame enclosure attachment device. The device secures an enclosure to the roof of a golf cart. The device has a sleeve that wraps around the frame of the golf cart roof and is secured by a zipper.

U.S. Pat. No. 6,276,745 issued on Aug. 21, 2001 to Wilson discloses a golf cart enclosure. The golf cart screen assembly comprises two frame assemblies for attachment to either side of an existing golf cart. The frame assemblies define doorways for receiving doors that slide along a bottom rail of each frame assembly.

U.S. Pat. No. 6,460,916 issued on Oct. 8, 2002 to Mizuta, F. discloses a utility vehicle. The vehicle is provided with a load carrying platform at a rear portion of the vehicle. A cabin frame is mounted around the driver's seat on the chassis of the vehicle.

U.S. Pat. No. 6,547,304 issued on Apr. 15, 2003 to Connor et al. discloses a golf cart cover. The golf cart cover is removably affixed to an attached frame and the existing roof support members of a golf cart. The attached frame comprises an upper frame, door posts and at least one removable door. The door may be stored in two positions on the frame or removed from the frame.

United Kingdom Patent Application 2 129 745 published on May 23, 1984 discloses a road vehicle with a removable load bearing superstructure. The load bearing superstructure comprises a frame that is secured to the rear chassis of a vehicle.

European Patent Application 0 237 494 published on Sep. 16, 1987 discloses a vehicle superstructure for a camper that may be secured to the chassis of a vehicle.

The patent documents listed above describe golf cart covers that may be secured to an existing golf cart frame. None of the above inventions, however, disclose a complete enclosure including a support frame, a roof, front and rear windshields and side doors that may be fitted to the chassis of an existing golf cart.

None of the above inventions and patents, taken either singly or in combination, is seen to describe the instant invention as claimed. Thus a golf cart enclosure solving the aforementioned problems is desired.

SUMMARY OF THE INVENTION

The golf cart enclosure is a complete, weatherproof enclosure that is mounted onto a golf cart chassis. The enclosure provides an entire passenger cabin including front and rear bibs, a support frame, front and rear windshields, sliding side doors and a roof. The support frame includes two side assemblies made from rectangular, hollow steel tubes and front and rear cross bars connecting the two side assemblies. The roof of the enclosure provides a number of bonded studs in the bottom surface of the roof that mount the roof onto the cross members of the support frame.

The front windshield is a sash type windshield having a fixed bottom portion and a slidably adjustable top portion. The top portion of the windshield may be lowered to let in a desired amount of air flow. An adjustable fastener is secured to the top portion of the front windshield to hold the windshield in a desired position. The rear windshield provides a right side portion and a left side portion, that are slidably adjustable.

The side doors of the enclosure are slidably mounted to the roof and the support frame. The side doors are top mounted and hang from tracks in the roof of the enclosure. A similar track is disposed along the bottom of the support frame for supporting the side doors. Each side door has a front portion and a rear portion that both slide along the side of the enclosure from an open position to a closed position.

Accordingly, it is a principal object of the invention to provide a complete golf cart enclosure having a support frame, a roof, side doors and windshields.

It is another object of the invention to provide a complete golf cart enclosure that is easily mounted to any golf cart chassis.

It is a further object of the invention to provide a complete golf cart enclosure that protects the passengers of the golf cart from undesirable weather conditions including rain, wind and sun.

Still another object of the invention is to provide a complete golf cart enclosure made from light weight, structurally secure materials.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 12A is a rear view of the front windshield in its closed position according to an alternate embodiment of the golf cart enclosure.

FIG. 12B is a rear view of the front windshield in its open position according to an alternate embodiment of the golf cart enclosure.

Similar reference characters denote corresponding features consistently throughout the attached drawings.

DETAILED DESCRIPTION OF THE PREFERRED EMBODIMENTS

Figure 1:
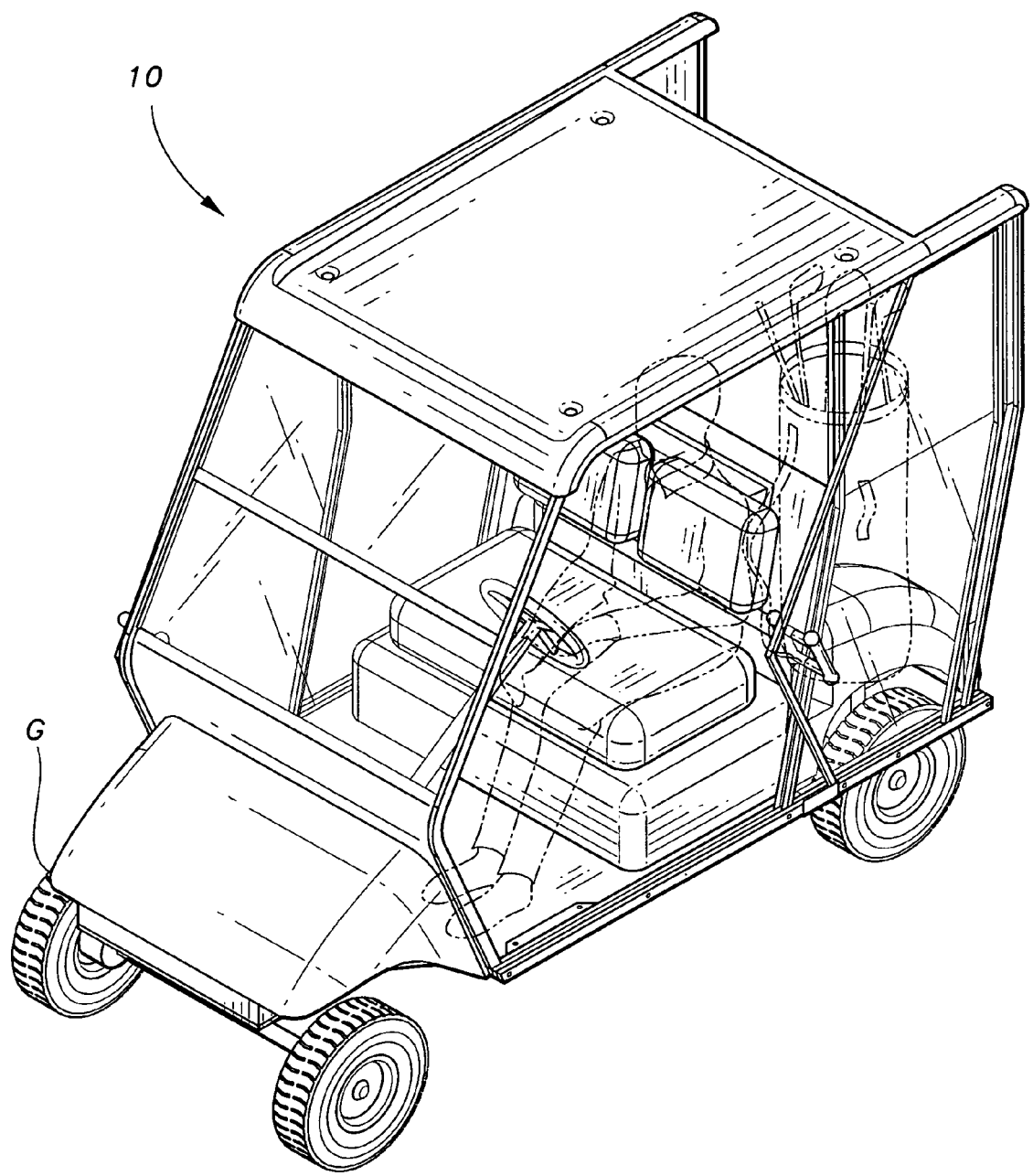
FIG. 1 is an environmental, perspective view of a golf cart enclosure according to the present invention.

The present invention is a golf cart enclosure that is secured to the chassis of a typical golf cart. FIG. 1 is an environmental perspective view of the golf cart enclosure 10 mounted in place on a golf cart G. The golf cart enclosure 10 is designed to protect the passenger from undesirable weather conditions such as rain, wind and extreme sun exposure. Because the golf cart G is not limited to being used on a golf course the golf cart enclosure 10 is designed to protect the passengers from weather conditions that may be experienced during any regular transportation in the golf cart G.

Figure 2:
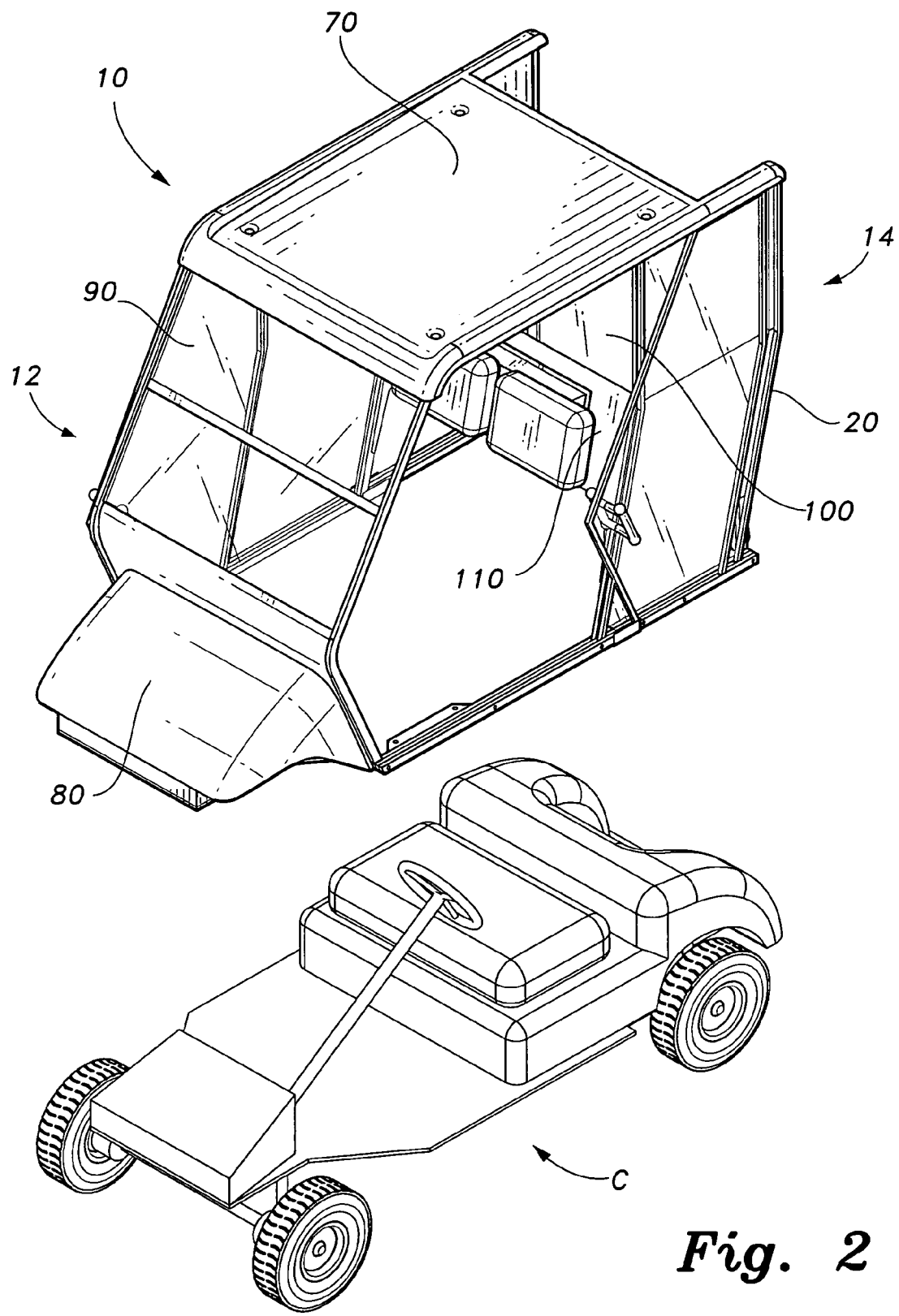
FIG. 2 is a partly-exploded, perspective view of the golf cart enclosure.

FIG. 2 is a perspective view of the enclosure 10 separated from the golf cart chassis C. The enclosure 10, having a front end 12 and a rear end 14, provides a complete passenger compartment that is mounted onto the chassis C of the golf cart G. The enclosure generally comprises a support frame 20 that defines the structure of the golf cart's passenger cabin. The enclosure 10 further comprises a roof 70 that is secured to the top of the support frame 20. A front bib 80, defining the front hood of the golf cart G, is disposed along the support frame 20 at the front end 12 of the enclosure 10. A rear bib 110, which separates the passenger compartment from a rear baggage area, is disposed along the support frame 20 at the rear end 14 of the enclosure 10. A front windshield 90 is mounted onto the support frame 20 at the front end 12 of the enclosure and a rear windshield 100 is mounted onto the support frame 20 at the rear end 14 of the enclosure 10.

Figure 3:
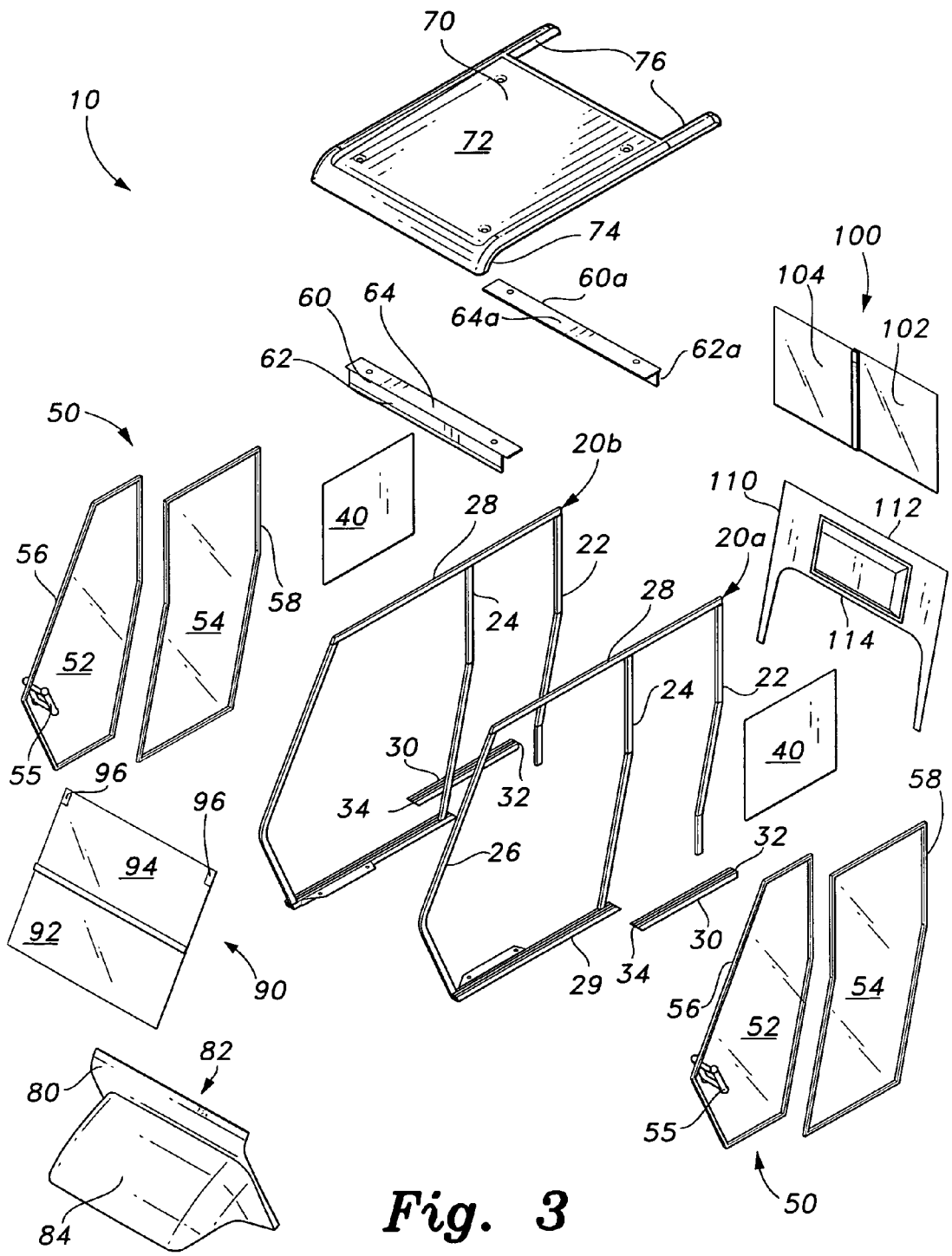
FIG. 3 is an exploded perspective view of the golf cart enclosure.
Figure 4:
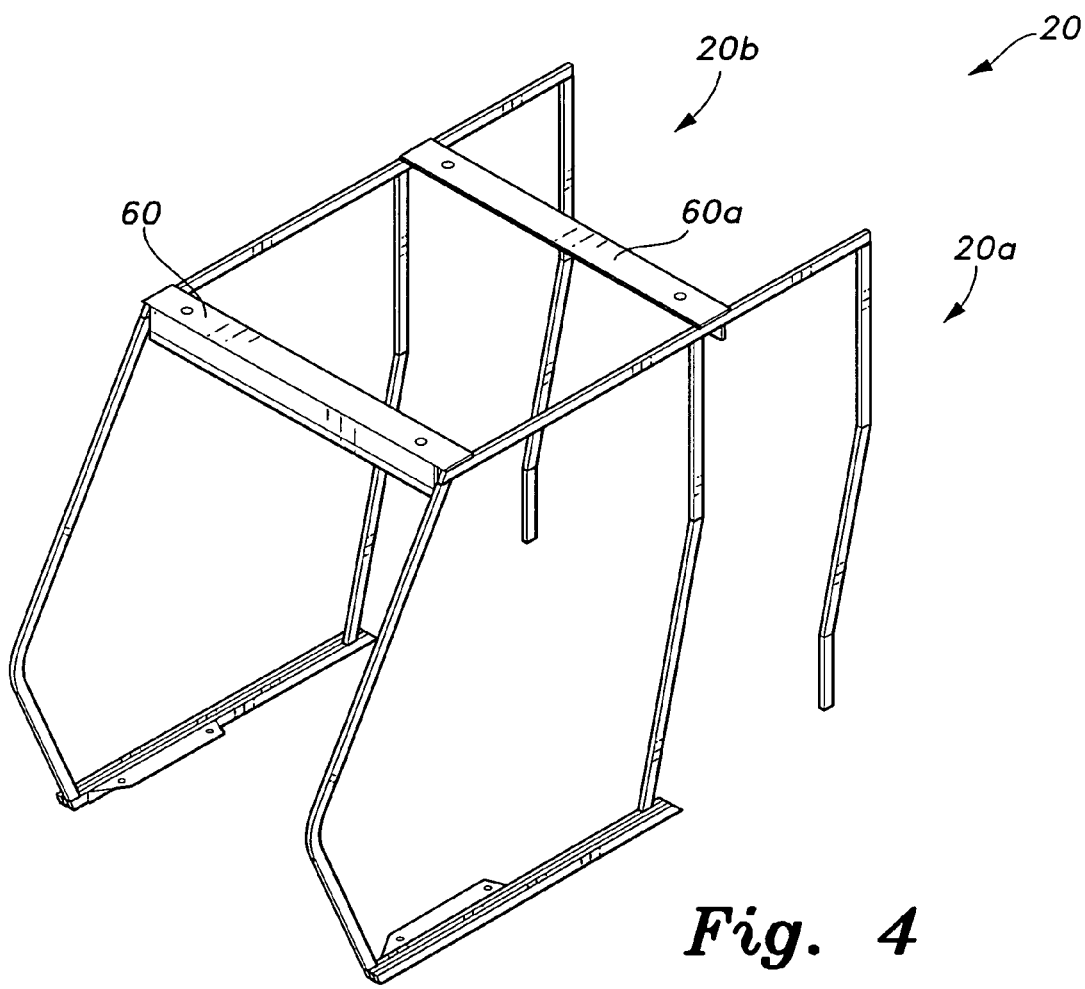
FIG. 4 is a perspective view of the support frame structure of the golf cart enclosure.

FIG. 3 is an exploded perspective view of the golf cart enclosure 10 depicting each of the individual parts of the enclosure 10 and how they are interconnected. The support frame 20 generally comprises bridged twin lateral frames 20a and 20b, a front cross bar 60 and a rear cross bar 60a (as shown in FIG. 4). Each of the twin lateral frames 20a and 20b comprise an angled vertical front member 26, an angled vertical center member 24 and an angled vertical rear member 22. A top frame member 28 extends along the top of each of the three vertical frame members 22, 24 and 26. A bottom frame member 29 extends along the bottom of each lateral frame 20a and 20b, connecting the front member 26 to the center member 24, but does not extend to the rear member 22. The individual members of the frame 20 are welded together to form the support frame 20.

Figure 9:
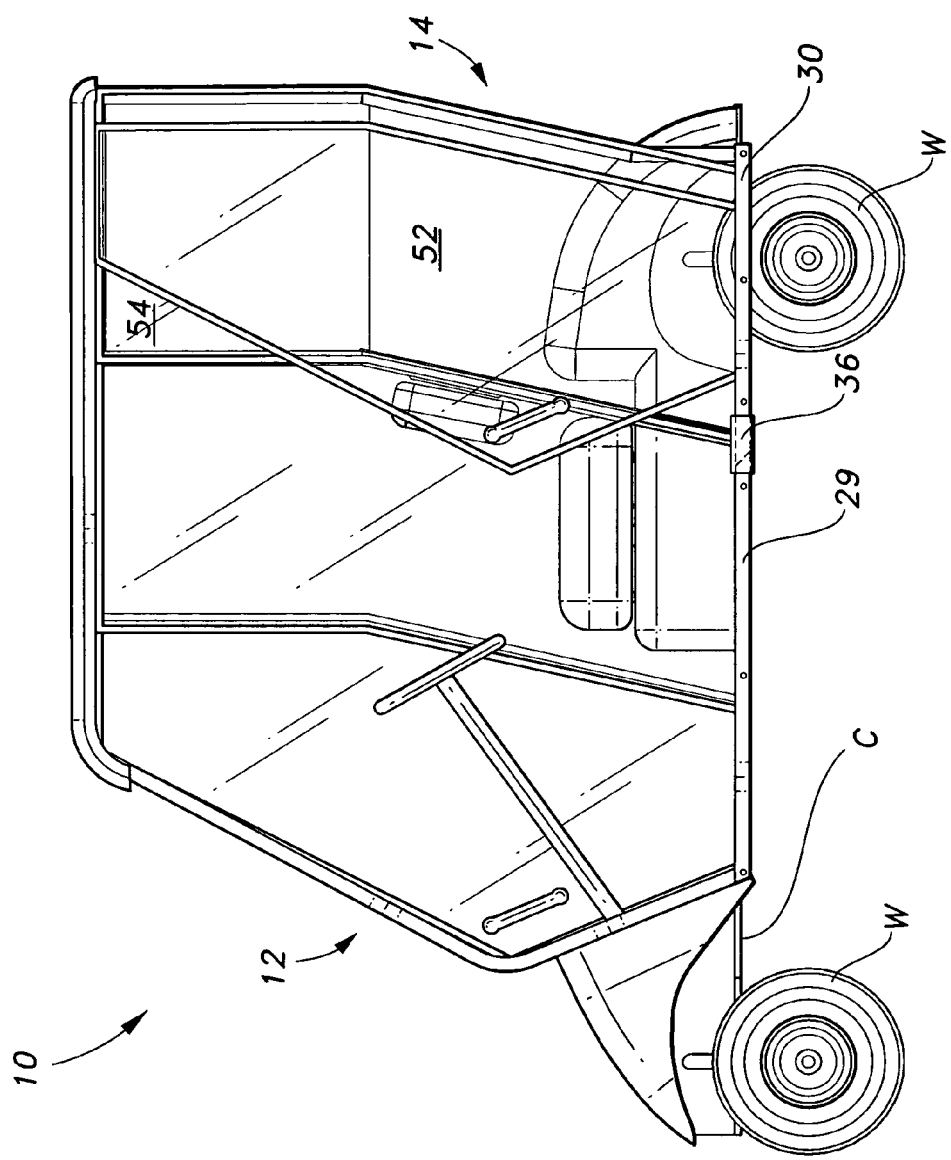
FIG. 9 is a side view of the golf cart enclosure with the sliding side doors in an open position.
Figure 10:
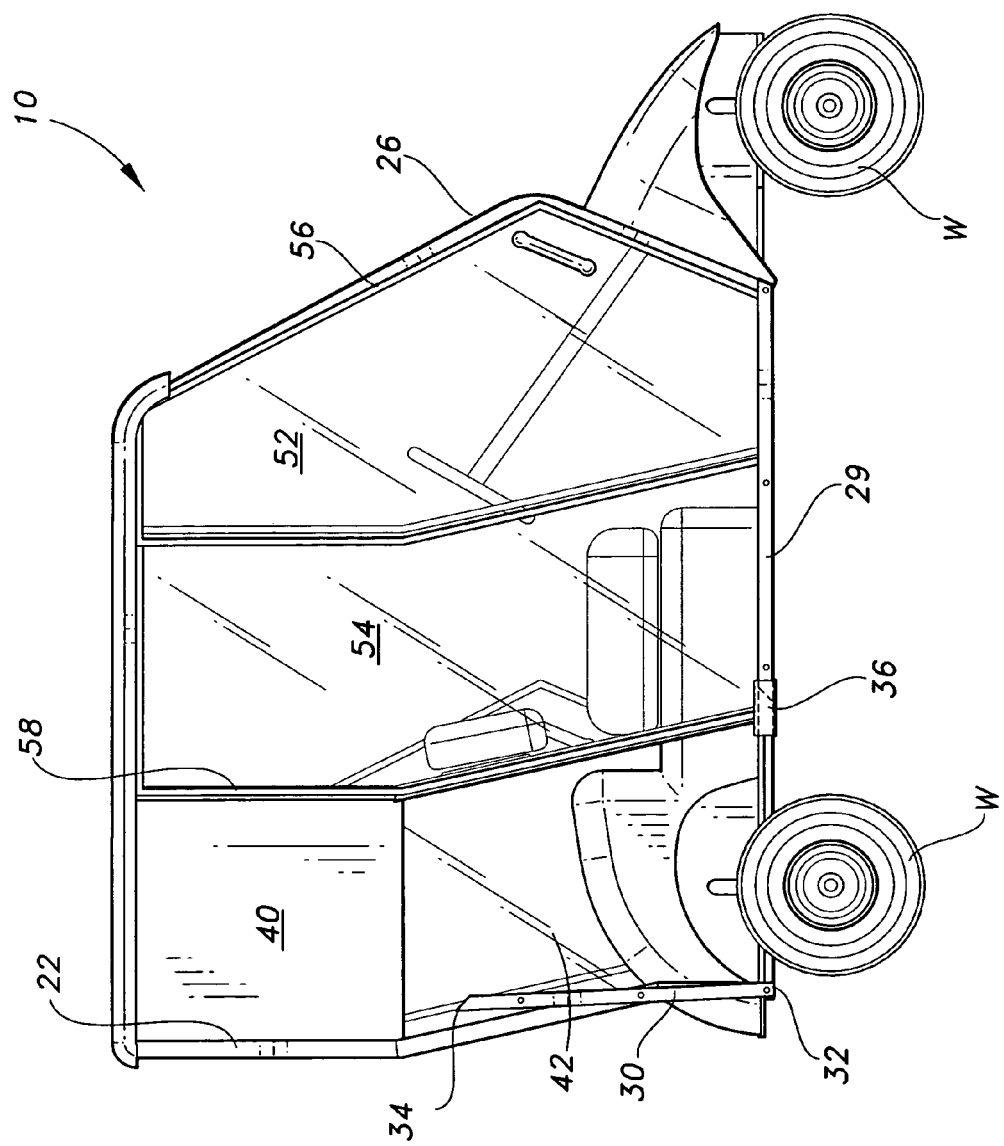
FIG. 10 is side view of the golf cart enclosure with the sliding side doors in the closed position.

The enclosure 10 provides a pivoting tire access member 30 having an elongate body with a pivot end 32 and a free end 34. The pivoting tire access member 30 is disposed along the bottom of each lateral frame 20a and 20b between the center vertical member 24 and the rear vertical member 22. The pivot end 32 of the access member 30 is pivotally secured to the bottom portion of the rear vertical member 22. The free end 34 of the access member 30 is not secured to the frame 20 so that the access member 30 may pivot freely about the pivot end 32. The access member 30 is movable from a closed access position (as shown in FIG. 9), horizontal along the bottom of the frame 20, to an open access position (as shown in FIG. 10), vertical along the rear vertical member 22. When the access member 30 is in the closed position it completes the bottom portion of the frame. When the access member 30 is in the open position, the user of the golf cart G may freely access the rear wheels W of the golf cart G.

Figure 5:
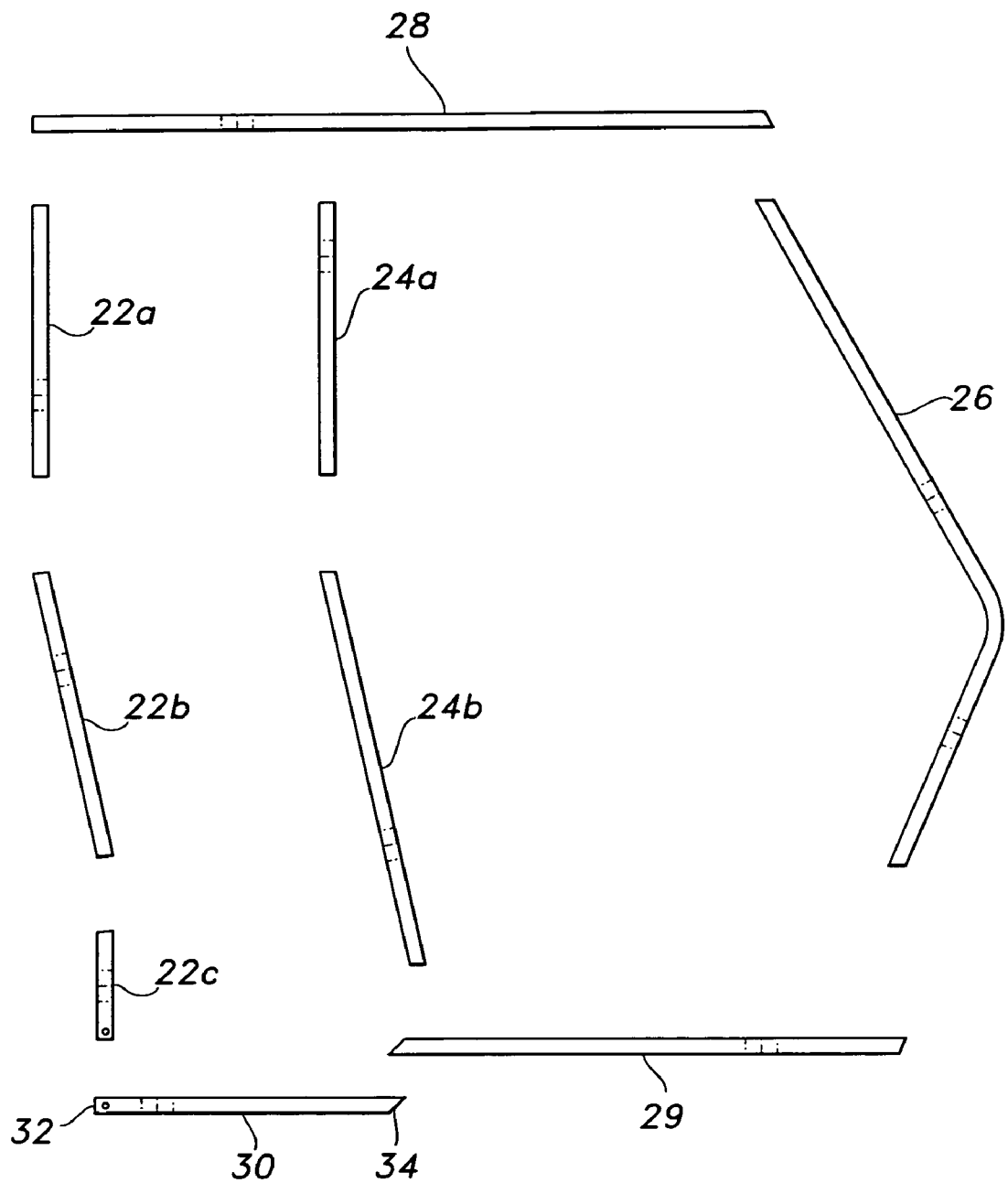
FIG. 5 is an exploded side view of one of the side frames of the golf cart enclosure.

FIG. 5 is an exploded side view of one of the lateral twin frames 20a. The lateral twin frames 20a and 20b are identical and include all of the same elements, therefore discussion of one lateral frame is sufficient. As discussed above, each lateral frame 20a and 20b comprises a top frame member 28, a bottom frame member 29, a front vertical member 26, a center vertical member 24 and a rear vertical member 22. The top frame member 28, the bottom frame member 29 and the front vertical frame member 26 each are made of a single unit. The center vertical member 24, however, comprises a top portion 24a and a bottom portion 24b. The rear vertical member 22 comprises a top portion 22a, a middle portion 22b and a bottom portion 22c. Each portion of the rear vertical member 22 and the center vertical member 24 are welded together to form the respective vertical members. The support frame 20 is secured to the chassis C by a plurality of bolts.

The front cross bar 60 extends along the front end 12 of the enclosure 10 and connects the front vertical members 26 of the twin lateral frames 20a and 20b. The front cross bar 60 provides a front windshield mount portion 62 and a front roof mount portion 64. The rear cross bar 60a has a generally identical structure to the front cross bar 60. The rear cross bar extends along the rear end 14 of the enclosure 10 and connects the rear vertical members 22 of the twin lateral frames 20a and 20b. The rear cross bar 60a provides a rear windshield mount portion 62a and a rear roof mount portion 64a. The front cross bar 60 and the rear cross bar 60a increase the strength and security of the support frame 20.

Figure 6:
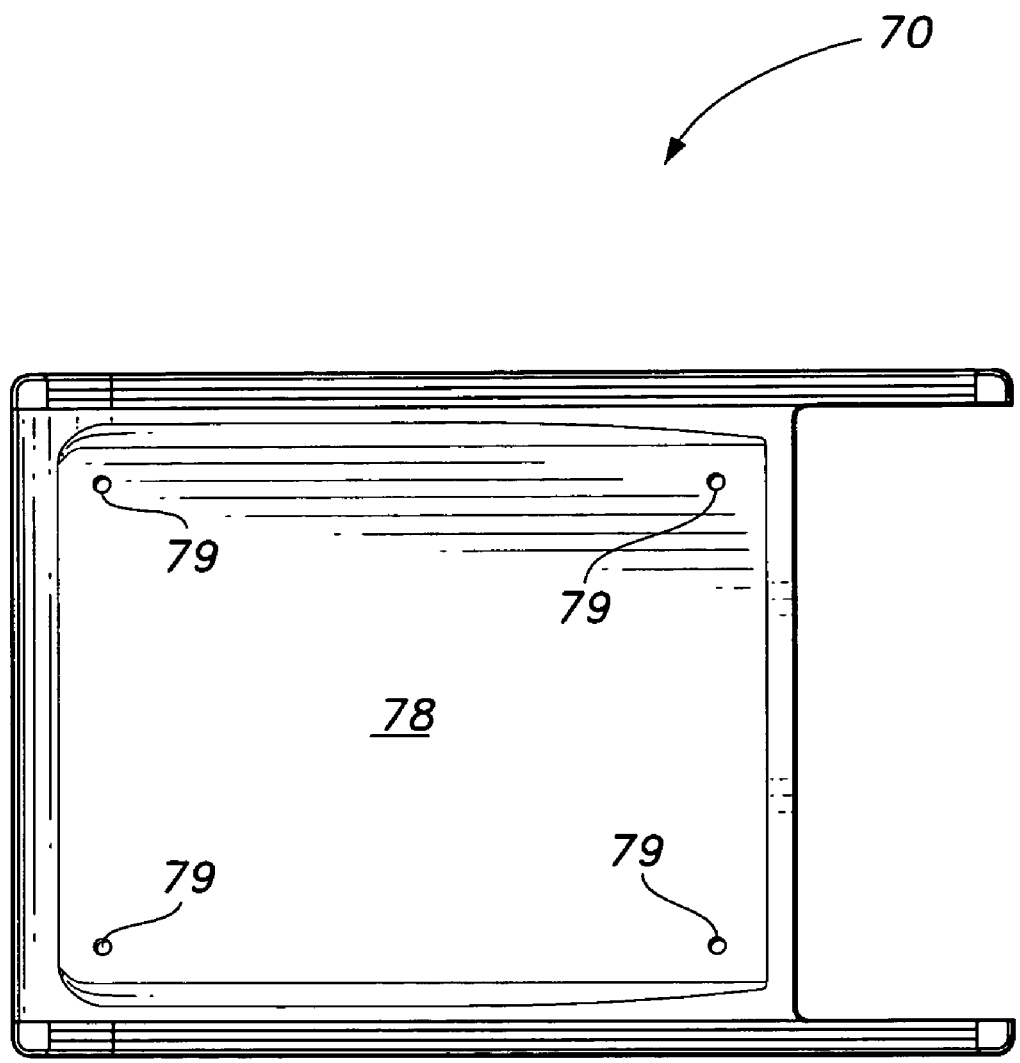
FIG. 6 is a bottom view of the roof of the golf cart enclosure.

The roof 70 comprises a generally rectangular main body with a generally flat top surface 72. The roof 70 also provides a front mounting portion 74 and a pair of rear roof extensions 76. The front mounting portion 74 is curved so that it hangs over the front cross bar 60. FIG. 6 is a bottom view of the roof 70. The roof 70 provides a plurality of bonded studs 79 disposed along the bottom surface 78 of the roof 70. The bonded studs 79 secure the roof 70 to the support frame 20. The bonded studs 79 include a pair of front studs for mounting onto the front cross bar 60 and a pair of rear studs for mounting onto the rear cross bar 60a.

The front bib 80, which defines the front hood portion of the golf cart G, is disposed along the front end 12 of the enclosure 10. The front bib 80 is secured to the front vertical member 26 on each of the twin lateral frames 20a and 20b. The front bib 80 comprises a curved front hood portion 84 and a front windshield mounting portion 82 at the top of the front bib 80.

Figure 7:
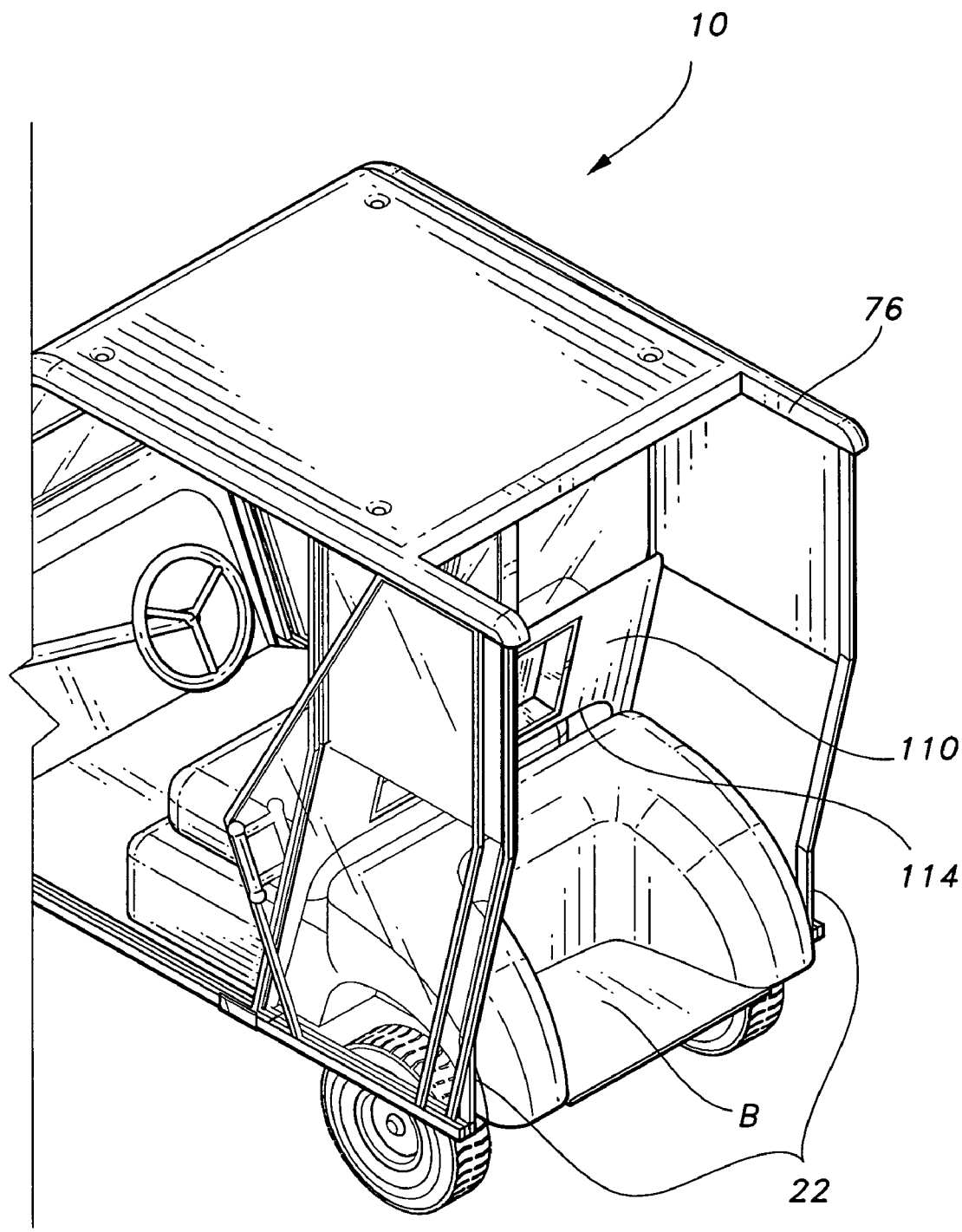
FIG. 7 is a rear perspective view of the golf cart enclosure.

The rear bib 110, which separates the passenger compartment from the rear baggage area B (shown in FIG. 7), is disposed along the support frame 20 at the rear end 14 of the enclosure 10. The rear bib 110 is disposed between the twin lateral frames 20a and 20b and is secured to the rear vertical members 22 of each lateral frame. The rear bib 110 comprises a cart mounting portion 114 that fits over the baggage area B of the golf cart G and a rear windshield mounting portion 112 that is positioned underneath of the rear windshield 100.

The front windshield 90 is mounted onto the support frame 20 at the front end 12 of the enclosure 10. The front windshield 90 is secured to the front vertical members 26 between the twin lateral frames 20a and 20b. The front windshield 90 is positioned on top of the front bib 80 along the windshield mount portion 82 and below the front cross bar 60. The front windshield 90 is a sash type window having a top portion 94 and a bottom portion 92. The bottom portion 92 is fixed. The top portion 94 is slidably adjustable along the front vertical members 26. The top portion 94 of the windshield 90 may be lowered to allow air to enter into the enclosure 10. The front windshield 90 further comprises a releasable position securing device 96. According to certain preferred embodiments of the present enclosure 10, the securing device 96 comprises a pair of magnets disposed on either side of the front windshield 90 that hold the top portion 94 in place by magnetically attaching themselves to the front vertical members 26.

The rear windshield 100 is mounted onto the support frame 20 at the rear end 14 of the enclosure 10. The rear windshield 100 is secured to the rear vertical members 22 between the twin lateral frames 20a and 20b. The rear windshield 100 is disposed on top of the rear bib 110 along the rear windshield receiving portion 112 and below the rear cross bar 60a. The rear windshield 100 comprises a right portion 102 and a left portion 104. The right portion 102 and the left portion 104 of the rear windshield 100 are laterally adjustable along the rear bib 110. The right portion 102 and the left portion 104 are free to slide over one another to allow air to enter into the golf cart enclosure 10.

The golf cart enclosure 10 further comprises a side door assembly 50 disposed on each of the twin lateral frames 20a and 20b. The side door assembly 50 comprises a forward side door 52 and a rearward side door 54. The forward door 52 has a front edge 56 that is shaped to conform to the angled contour of the front vertical member 26. The rearward door 54 has a rear edge 58 that is shaped to conform to the angled contour of the rear vertical member 22. A handle 55 is disposed along the forward door 52.

Figure 11:
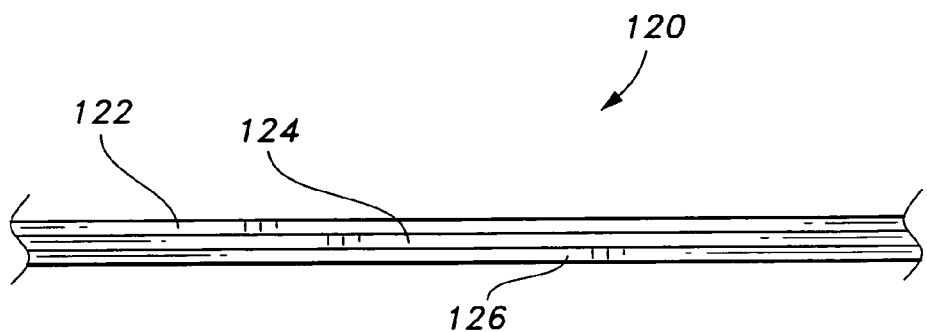
FIG. 11 is a top view of one of the side door receiving tracks of the golf cart enclosure.

The forward door 52 and the rearward door 54 are slidably disposed along the lateral frames 20a and 20b. The doors 52 and 54 are top mounted and hang from the top of the vehicle. FIG. 11 depicts a track member 120 that is disposed along the underside of the roof 70. The track member comprises three tracks 122, 124 and 126. The side doors 52 and 54 each comprise a roller assembly (not shown) that each engage one of the tracks 122, 124 or 126. A triple guide door supporting system is positioned along the bottom frame member 29 of each lateral frame 20a and 20b. The triple guide system is identical to the track member 120 shown in FIG. 11. The bottom of the side doors 52 and 54 do not include a roller assembly, the side doors 52 and 54 simply rest on the bottom tracks.

The side doors 52 and 54 are slidably adjustable along the lateral frame members 20a and 20b. FIG. 10 shows the side doors 52 and 54 in the closed position. In the closed position the forward side door 52 is positioned along the front vertical members 26. The rearward side door 54 is positioned between the center vertical member 24 and the forward side door 52. FIG. 9 depicts the sliding side doors 52 and 54 in an open position. In the open position the forward sliding door 52 is first slid rearwardly over the rearward side door 54, similar to the way sliding doors on a typical shower slide over one another. The forward sliding door 52 and the rearward sliding door 54 are then slid rearwardly until they reach the rear vertical member 22. Once the side doors 52 and 54 are in the open position the passengers of the golf cart G may enter or exit the enclosure 10.

A protective back panel 40 is disposed along each of the lateral frames 20a and 20b between the rear vertical frame member 22 and the center vertical frame member 24. An access opening 42 is disposed underneath of the protective back panel 40 on each side of the enclosure 10. The access opening 42 provides access to the rear baggage area B.

FIG. 9 depicts the wheel access member 30 in a closed position. In the closed position the wheel access member 30 is secured to the bottom frame member 29 by a clamp 36. In the closed position the wheel access member 30 completes the bottom portion of the frame 20 to support the side doors 52 and 54 when they are in the open position. FIG. 10 depicts the wheel access member 30 in an open position. In the open position the access member 30 is pivoted upwardly and positioned along the rear vertical frame member 22. When the access member 30 is in the open position the passenger of the golf cart G has access to the rear wheels.

Figure 8:
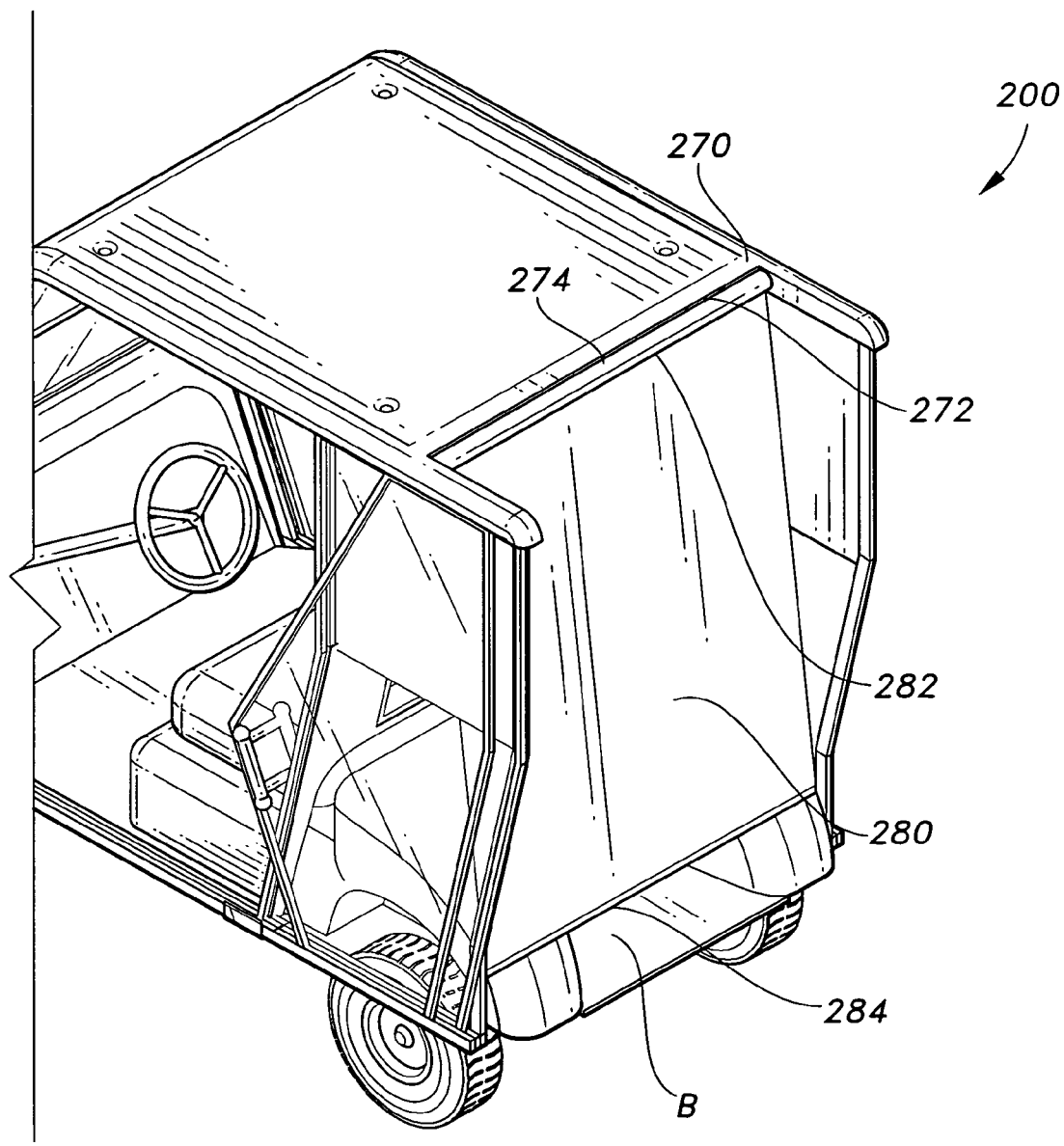
FIG. 8 is a rear perspective view of the golf cart enclosure according to an alternate embodiment of the present invention.

FIG. 8 is a rear view of a golf cart enclosure 200 according to a certain alternate embodiment of the present invention. The enclosure 200 of the present embodiment provides an optional cover 280 for the baggage area B of the golf cart. The cover 280 is secured to the roof 270 of the enclosure 200. A cover bracket 274 is secured to the rear edge 272 of the roof 270. The cover bracket 274 is a generally cylindrical hollow rod. The baggage cover 280 has a top edge that is mounted to the roof 270 by the cover bracket 274 and a bottom edge 284 that is positioned adjacent the top surface of the baggage area G. The baggage area cover 280 may be pulled down to cover the contents of the baggage area B during undesirable weather conditions. When the weather conditions are desirable, or when access to the baggage area B is necessary, the cover 280 is rolled up and held in place by the cover bracket 274. The baggage area cover 280 is preferably made from a flexible, waterproof material.

FIGS. 12A and 12B depict a certain alternate embodiment of the front windshield 390. According to certain preferred embodiments of the present invention, the front windshield 390 further comprises an adjustment knob 396. In certain weather conditions, when the front windshield 390 is in the closed position, the front windshield 390 will mist/fog over making it difficult for the driver of the golf cart G to see. The mist/fog on the front windshield 390 may be prevented by allowing a slight breeze of outside air to enter into the enclosure 300. The adjustment knob 396 of the present embodiment allows the top portion 394 of the windshield 390 to be lowered two inches to allow a small amount of air to enter into the enclosure 300. A strap 398 is secured to the bottom surface 378 of the roof 370. The strap includes a top hole 397 and a bottom hole 395. The two holes 395 and 397 are adapted to receive the adjustment knob 396. FIG. 12A shows the windshield in the closed position. In the closed position the knob 396 is held in place by the top hole 397 in the strap 398. FIG. 12B shows the windshield in the open position. In the open position the knob 396 is held in place by the bottom hole 395 in the strap 398. This allows the top portion 394 of the window to be held in a slightly open position providing a two inch gap above the top of the windshield 390.

To prevent the golf cart G from being top heavy and tipping over it is important that the golf cart enclosure 10 be made from light weight materials, while still providing sufficient strength and support. The support frame 20, and the cross bars 60 and 60a, are made from rectangular, hollow steel tubes. The rear bib 110 and the roof 70 are each made as one piece fiber glass moldings. The front bib 110 is one piece made from sheet aluminum. The cover bracket 274 is made from extruded aluminum. The panels of the side doors assemblies 50, the front windshield 90, the rear windshield 100, and the rear protective cover 40 are all made from impact resistant polycarbonate.

It is to be understood that the present invention is not limited to the embodiments described above, but encompasses any and all embodiments within the scope of the following claims.

We claim:
1. A golf cart enclosure, comprising:
a support structure having two lateral frames, each frame being disposed on one side of said enclosure, a front cross bar disposed across a front end of said enclosure between said lateral frames, and a rear cross bar disposed across a rear end of said enclosure between said lateral frames, each of said lateral frames comprising a front vertical member, a center vertical member, a rear vertical member, a top horizontal member disposed across said front, center and rear vertical members, and a bottom horizontal member disposed across said front vertical member and said center vertical member;
a roof secured on top of said support structure;
a front bib, defining a front hood portion of said enclosure, secured to the front vertical members of said lateral frames;
a rear bib secured to the rear vertical members of said lateral frames, said rear bib separating a passenger compartment from a rear baggage area;
a front windshield mounted onto the support structure at the front end of said enclosure;
a rear windshield mounted onto the support structure at the rear end of said enclosure;
a side door assembly disposed along each of said lateral frames; and
a pivoting wheel access member pivotally connected to a bottom portion of said rear vertical frame member on each of said lateral frames;
whereby said enclosure is fitted to an existing golf cart chassis to provide a complete weatherproof enclosure for a golf cart.
2. The golf cart enclosure according to claim 1, wherein said roof comprises a generally rectangular main body with a top surface and a bottom surface, and a plurality of bonded studs disposed along the bottom surface of said roof, whereby said roof is secured to said front cross bar and said rear cross bar by said bonded studs.

3. The golf cart according to claim 1, wherein said front windshield is mounted on top of the front bib and secured to the front vertical members of said lateral frames.

4. The golf cart according to claim 1, wherein said front windshield comprises a fixed bottom portion, a slidably adjustable top portion and an adjustable fastener for securing said top portion in a desired position.

5. The golf cart according to claim 4, wherein said adjustable fastener comprises a pair of magnets disposed on either side of said top portion.

6. The golf cart according to claim 1, wherein said rear windshield comprises a right portion and a left portion, said right portion and said left portion being slidably adjustable from a closed position to an open position.

7. The golf cart according to claim 1, wherein each of said side door assemblies comprises a forward side door and a rearward side door, wherein said enclosure includes track members for hanging said forward side door and said rearward side door.

8. The golf cart enclosure according to claim 7, further comprising a pair of track members, each having a plurality of door receiving tracks, disposed along the bottom surface of said roof on either side of said roof, wherein said forward doors and said rearward doors are slidably secured to said track members.

9. The golf cart enclosure according to claim 1, further comprising a protective back panel disposed along each of said lateral frames between the rear vertical frame member and the center vertical frame member.

10. The golf cart according to claim 9, further comprising an access opening disposed between the rear vertical frame member and the center vertical frame member underneath said protective back panel.

11. The golf cart enclosure according to claim 1, further comprising a baggage area cover secured to said roof by a cover bracket, wherein said baggage area cover comprises a flexible, waterproof sheet for protecting the contents of the baggage area.

12. A golf cart enclosure, comprising:
a support structure having two lateral frames, each frame being disposed on one side of said enclosure, a front cross bar disposed across a front end of said enclosure between said lateral frames, and a rear cross bar disposed across a rear end of said enclosure between said lateral frames, each of said lateral frames comprising a front vertical member, a center vertical member, a rear vertical member, a top horizontal member disposed across said front, center and rear vertical members, and a bottom horizontal member disposed across said front vertical member and said center vertical member;
a roof secured on top of said support structure;
a front bib, defining a front hood portion of said enclosure, secured to the front vertical members of said lateral frames;
a rear bib secured to the rear vertical members of said lateral frames, said rear bib separating a passenger compartment from a rear baggage area;
a front windshield mounted onto the support structure at the front end of said enclosure, said front windshield comprising a fixed bottom portion, a slidably adjustable top portion and an adjustable fastener for securing said top portion in a desired position;
a windshield adjustment knob secured to the top portion of said windshield and a knob retaining strap secured to the bottom surface of said roof having a pair of knob receiving holes, whereby said adjustment knob secures said front windshield in an open position when received in a first of said knob receiving holes and in a closed position when received in a second of said knob receiving holes;
a rear windshield mounted onto the support structure at the rear end of said enclosure; and
a side door assembly disposed along each of said lateral frames;
whereby said enclosure is fitted to an existing golf cart chassis to provide a complete weatherproof enclosure for a golf cart.

13. The golf cart enclosure according to claim 1, wherein said support structure is made from generally rectangular, hollow steel tubes.

14. The golf cart enclosure according to claim 1, wherein said rear bib and said roof are each made from one piece fiber glass moldings.

15. The golf cart according to claim 1, wherein said front bib is made from a single piece of sheet aluminum.

16. The golf cart enclosure according to claim 4, whereby said forward side door and said rearward side door are made from impact resistant polycarbonate panels.

17. The golf cart enclosure according to claim 1, whereby said front windshield and said rear windshield are made from impact resistant polycarbonate panels.

* * * * *